(12) United States Patent
Fry

(10) Patent No.: US 8,287,227 B2
(45) Date of Patent: Oct. 16, 2012

(54) CATALYST LOADING SYSTEM

(75) Inventor: Paul Fry, League City, TX (US)

(73) Assignee: Catalyst Services, Inc., Deer Park, TX (US)

( * ) Notice: Subject to any disclaimer, the term of this patent is extended or adjusted under 35 U.S.C. 154(b) by 2 days.

(21) Appl. No.: 13/039,094

(22) Filed: Mar. 2, 2011

(65) Prior Publication Data

US 2011/0150624 A1    Jun. 23, 2011

Related U.S. Application Data

(62) Division of application No. 11/756,961, filed on Jun. 1, 2007, now Pat. No. 8,025,472.

(51) Int. Cl.
*B65G 67/16* (2006.01)

(52) U.S. Cl. ............ 414/804; 414/160; 414/808; 141/1; 141/286

(58) Field of Classification Search ................... 141/286, 141/1, 2; 414/806, 804, 160, 287, 808, 146, 414/147

See application file for complete search history.

(56) References Cited

U.S. PATENT DOCUMENTS

| | | | | |
|---|---|---|---|---|
| 3,207,238 A | * | 9/1965 | Davidson et al. | 175/14 |
| 3,608,751 A | * | 9/1971 | Hundtofte | 414/287 |
| 4,557,637 A | * | 12/1985 | Barclay et al. | 406/153 |
| 5,247,970 A | * | 9/1993 | Ryntveit et al. | 141/1 |
| 5,890,868 A | * | 4/1999 | Comardo | 414/587 |
| 6,182,716 B1 | * | 2/2001 | Fry | 141/67 |
| 6,467,513 B1 | * | 10/2002 | Yanaru et al. | 141/12 |
| 6,981,422 B1 | * | 1/2006 | Comardo | 73/756 |
| 2006/0213575 A1 | * | 9/2006 | McNaughton | 141/286 |
| 2006/0233631 A1 | * | 10/2006 | Diehl et al. | 414/287 |
| 2007/0084519 A1 | * | 4/2007 | Brennom | 141/2 |

FOREIGN PATENT DOCUMENTS

| | | |
|---|---|---|
| EP | 0 548 999 | 6/1993 |
| EP | 1 374 985 | 1/2004 |
| EP | 1 749 568 | 2/2007 |
| WO | WO 2004/028679 | 4/2004 |
| WO | WO 2006/104832 | 10/2006 |

OTHER PUBLICATIONS

Thomasson, Philippe, Supplementary European Search Report, Aug. 3, 2011, 3 pages, European Patent Office, Munich, EP.

* cited by examiner

*Primary Examiner* — Saul Rodriguez
*Assistant Examiner* — Glenn Myers
(74) *Attorney, Agent, or Firm* — Mark A. Oathout; Oathout Law Firm

(57) ABSTRACT

Particulate filling devices and methods are disclosed that use a loading system generally including a loading cart, a drive system, and a line assembly. The drive system generally includes a motor, a drive shaft, a driven shaft, a spool, a plurality of cable partitions, and a controller. Each line assembly generally includes cable sections, swivel connectors, one or more spring blocks and a weight.

11 Claims, 3 Drawing Sheets

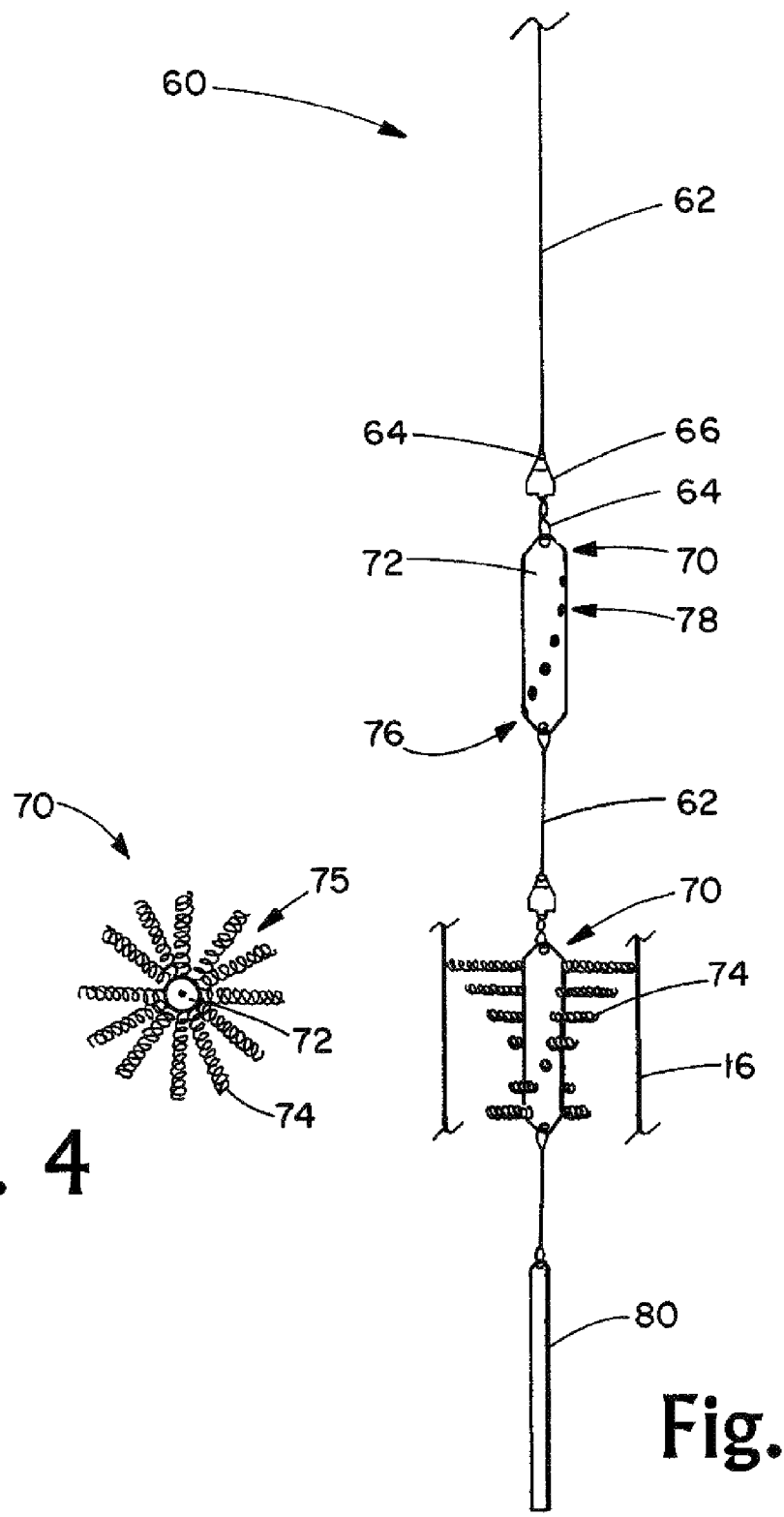

CATALYST LOADING SYSTEM

CROSS-REFERENCE TO RELATED APPLICATIONS

This application is a divisional of U.S. application Ser. No. 11/756,961 filed Jun. 1, 2007 now U.S. Pat. No. 8,025,472 which is herein incorporated by reference in its entirety.

FEDERALLY SPONSORED RESEARCH OR DEVELOPMENT

Not applicable.

REFERENCE TO LISTING, TABLES OR COMPACT DISK APPENDIX

Not applicable.

BACKGROUND

Catalyst is loaded into reactor tubes within a tubular reactor. The loading is a precursor to carrying out a reaction within such vessel. The tubes normally vary in diameter from 0.75 inches up to 2.5 inches (6.35 cm.). Catalyst breakage is a problem during the loading process. The breakage is believed to be due to the fact that catalyst has become softer and more fragile. Catalyst breakage further confounds the process as it can lead to tubes having a higher differential pressure across the tube. These processes include, but are not limited to, the use of methanol, ethylene glycol, acrylic acid, mercaptian converters and vinyl acid to name a few.

SUMMARY

There are several objectives of the invention(s). Primarily, however, the embodiment(s) seek to create uniformity in the loading of catalyst particulate into reactor tubes while reducing breakage and fracturing of the catalyst particles A device and techniques are needed that can work within a tube environment where the tube is not symmetrical (e.g. deformed and/or bent tube walls).

A device and techniques are needed that can inhibit or avoid altogether the fracture of catalyst or other particles. This problem is more acute with large radius catalyst or other particles having a greater mass, or particulate which may be more brittle.

A device and techniques are needed that can aid in the dislodging of the device in the event it does become 'stuck' within a tube.

A device and techniques are needed that can allow a vacuum hose to pass through or to pass outside the device (but within the tube) especially in small diameter tubes.

Particulate filling devices and methods are disclosed that use a loading system generally including a loading cart, a drive system, and a line assembly. The drive system generally includes a motor, a drive shaft, a driven shaft, a spool, a plurality of cable partitions, and a controller. Each line assembly generally includes cable sections, swivel connectors, one or more spring blocks and a weight.

As used below the term "helix-patterned", "helix-like pattern" or "helix-pattern" means that the device is made up of individual spring members that have the figuration of a helix but that the spring members make a non-continuous surface as opposed to a continuous helical surface.

BRIEF DESCRIPTION OF THE DRAWINGS

FIG. 3 is an elevation view of one embodiment of a line assembly depicting one spring block without springs to as to better represent the holes through the block portion.

FIG. 4 is a top view of one embodiment of a spring block.

DETAILED DESCRIPTION OF THE PREFERRED EMBODIMENT(S)

Figure 1:
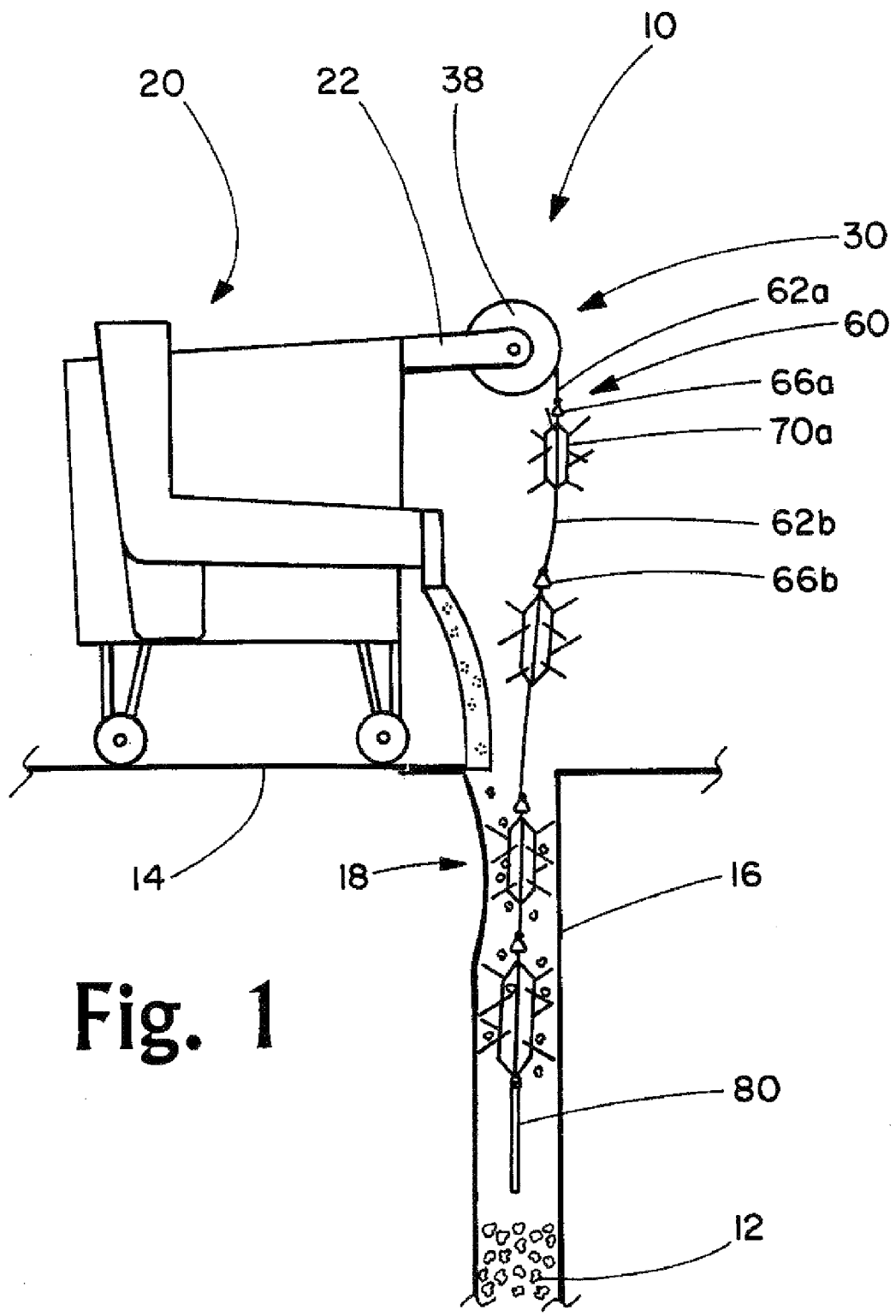
FIG. 1 is a schematic elevation view of one embodiment with a reactor tube shown in cross-section.

A loading system 10 (FIG. 1) may be used for loading catalyst (or other) particulate matter 12. The loading system 10 generally includes a loading cart 20, a drive system 30, and a line assembly 60. The loading cart 20 is positioned on a surface such as a tube sheet 14 and diverts/merges the catalyst particulate 12 into individual reactor tubes 16.

The loading cart 20 could be any commercially available loading cart 20 which may be modified for mounting of the drive system 30. For the loading cart 20 shown, mounting brackets 22 connect to the loading cart 20 to the drive system 30. The line assembly 60 connects to the drive system 30.

The drive system 30 (FIG. 2) generally includes a motor 32, a drive shaft 34, a driven shaft 36, a spool 38, a plurality of cable partitions 40, and a controller 50. The motor 32 connects and outputs to drive shaft 34. The drive shaft 34 is connected by a connector 42 to the driven shaft 36. The spool 38 engages and is mounted over the driven shaft 36. The plurality of cable partitions 40 (eleven shown in FIG. 2) are attached to the spool 38. The controller 50 is linked to the motor 32.

The motor 32 is preferably a variable speed motor and may be powered electrically, pneumatically, hydraulically, by hand (via a hand crank not shown), by water or the like. The motor 32 is used to drive the drive system 30 either in forward or reverse to raise or lower respective line assemblies 60 (ten would be implemented in the system shown and used for loading ten individual reactor tubes 16 at a time).

Connector 42 may be used for making the connection to the output/drive shaft 34 of the motor 32, or it could be used for connection to a hand crank (not shown).

Figure 2:
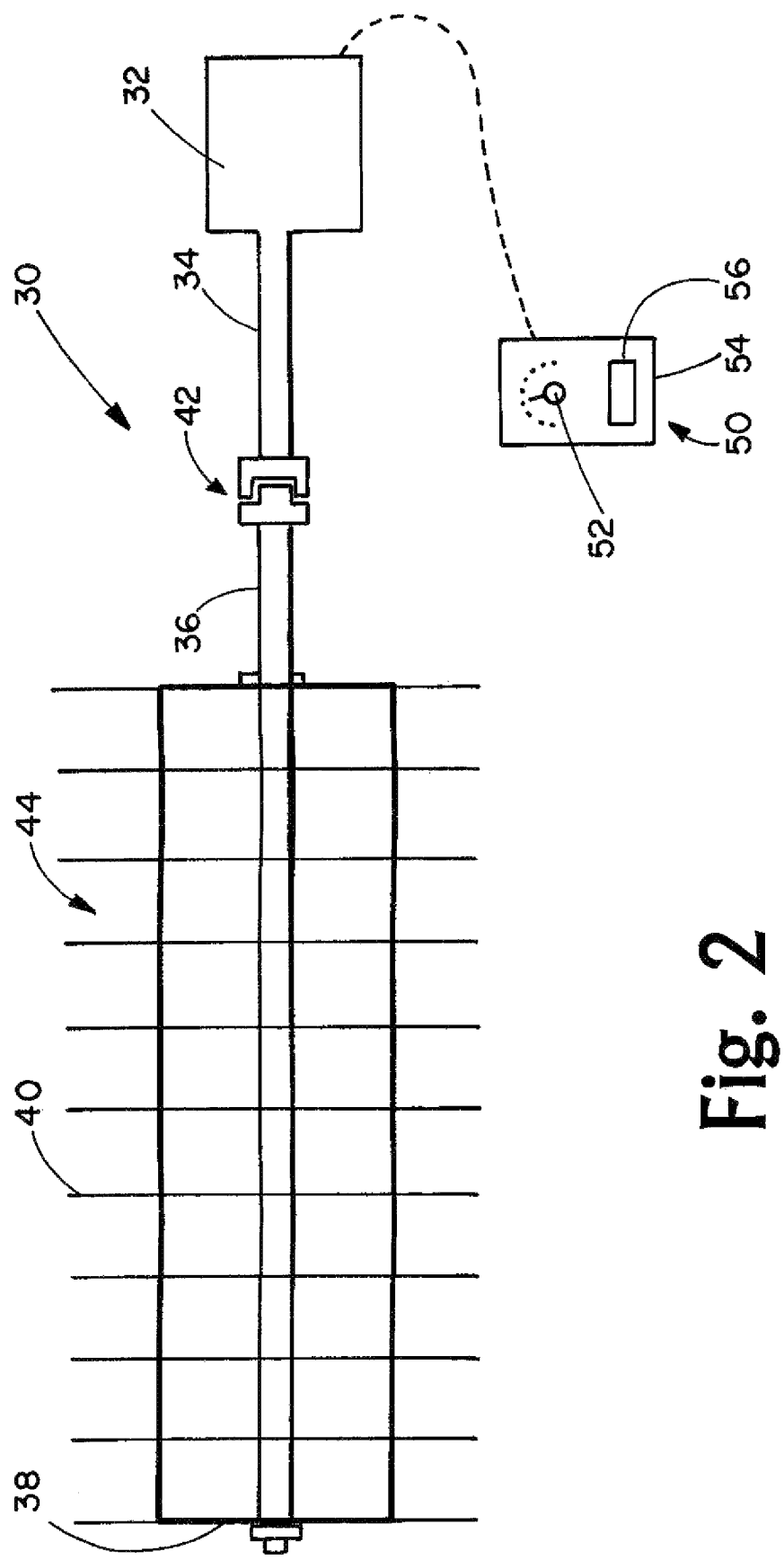
FIG. 2 is a top schematic view of an embodiment of the drive system.

The plurality of cable partitions 40 are mounted to and wrap around the spool 38. The plurality of cable partitions 40 define a plurality of cable compartments 44. The spacing of each consecutive partition 40 can vary to accommodate the spacing between individual reactor tubes 16. Such variance in the spacing may be accomplished by building several different spools 38 or by making the partitions adjustable/slideable along the spool 38. Although ten evenly spaced compartments are represented in FIG. 2, the number and spacing of the compartments may be adjusted as dictated by the loading job to be performed.

The spool 38 functions like a winch, and can be used to reel up each line assembly 60 during the catalyst loading process. It may be made of a durable material.

The controller 50 is used to control or change the rate of retrieval of the line assemblies 60 from the reactor tubes 16. The controller 50 is variable speed and may include an adjustable knob 52, toggle switch (not shown) or the like mounted to the control pad 54. The variable speed controller 50 may also include a rate display window 56. The controller 50 may be electric or built as a regulator if pneumatic. Although the controller 50 is variable speed, the individual operator's setting of the speed is dependent upon the fill or catalyst loading rate (i.e. the rate at which the catalyst particulate matter 12 is actually filling the interior volume of the reactor tubes 16). In other words, it is critical that the line assemblies 60 not be withdrawn from the reactor tubes 16 at a rate which is any faster than the catalyst loading rate. For example, if the catalyst loading rate is one foot of the reactor tubes 16 every seven seconds, then the line assembly 60 withdrawal speed should be set at one foot every seven seconds or 0.143 feet/second.

Each line assembly 60 (FIGS. 1 and 3) generally includes cable sections 62, swivel connectors 66, one or more spring blocks 70 and a weight(s) 80. One end of the top-most cable section 62a is attached to the spool 38 while the other end attaches to a swivel connector 66a such as with a ring clip 64. Other cable sections 62b connect spring blocks 70a to swivel connectors 66b and/or to weight 80 via devices such as ring clips and/or an eye at the end of the cable section 62. The length of each respective intermediate cable section 62 depends upon the spacing distance to be placed between each consecutive spring block 70 along the line assembly 60. This spacing distance relates to a variety of factors, namely, the distance each respective type of a catalyst particle 12 can fall without fracturing or breaking, prevention of the catalyst particles 12 from ever reaching sonic velocity while falling within the tube 16, and the potential to design the line assembly 60 to further divert/deflect the vertical velocity/path of the fall as the catalyst particles 12 (into a changed spiral-through-multiple-horizontal-planes type of a flow path) as the catalyst particles 12 progress down the tube 16. Hence in one example the spacing distance between the lower most consecutive spring blocks 70, as dictated by the length of each respective intermediate cable section 62, is reduced as compared to upper spacings (e.g. given a thirty foot (9.13 meters) line assembly 60, the uppermost twenty feet (6.09 meters) may have spring blocks 70 spaced apart every four feet (1.22 meters) whilst the lowermost ten feet (3.02 meters) may have spring blocks 70 spaced apart every two feet (0.61 meters); or spring blocks 70 may never have a spacing distance greater than ten feet (3.02 meters) with in another example embodiment the upper most blocks 70 spaced by four feet (1.22 meters), and next approaching the lower end of line assembly 60 two spring blocks 70 spaced by three feet (0.91 meters), then two spring blocks 70 spaced by two feet (0.61 meters), and the last two spring blocks 70 spaced by one foot (0.30 meters) having a weight 80 at the lowermost extremity). The cable sections 62 are preferably made from stainless steel and may be sheathed in plastic.

The swivel connector(s) 66 may be connected at any desirable point along the line assembly 60 and as shown are connected adjacent and above each spring block 70. As shown, the upper end of the swivel connector 66 is connected to a cable section 62 whilst the lower end is connected to a spring block 70. Each swivel connector 66 may, for example, be a commercially available stainless steel swivel.

The spring blocks 70 (FIGS. 3 and 4) generally include the block portion 72 and the plurality of springs 74. The block portion 72 includes a plurality of holes 78 through the block portion 72, and preferably are placed in a helix-like pattern 76 along and around the block portion 72, although other patterns such as quadruple helix, a variably sloped helix or a zigzag may be implemented. The size of the catalyst (or other) particulate matter 12 and the diameter of the reactor tube will dictate the number, pattern, size and spacing of the holes 78. The diameter of the holes 78 are selected for optimal mounting of the springs 74. The block portion is preferably made of stainless steel and may be shaped in cross-section, by way of example, round, square, octagon, rectangular, etc. The round cross-shape is presently preferred due to reduction of corners and edges where catalyst particles may impinge and rub. Each line assembly will preferably, but not necessarily, include at least two spring blocks 70.

A plurality of springs 74 are connected through the respective holes in the block portion 72. Contact cement or a small locking device may be used to hold the springs 74 within the block portion 72. Each spring 74 is oriented perpendicular to the axial length of the line assembly and/or the block portion 72. The springs 74 may be stainless steel coil springs, plastic strips or other biasable material. The tensile strengths, stiffness and diameters of the springs may vary depending on the size and weight of the catalyst (or other) particulate matter 12 given that the primary purpose of the springs 74 is to break and divert the fall of the particulate matter 12 while imparting rotation to a spring block 70 (due to impact from the particulate matter 12.

The weight 80 is preferably placed at the lowermost end of the line assembly 60. It is also made of a series of stainless steel. The weight 80 dampens the vibration of the line assembly 60 due to collision between the particulate matter 12 and the line assembly 60, and also assists the line assembly 60 in centering within a reactor tube 16. The weight amount, length and width can vary and is a function of the size of the particulate matter 12 and the catalyst loading rate. By way of example, a weight 80 could be two ounces, however the actual weight is really a function of the length of the tube 16 (i.e. the longer the tube the lower the weight because the cumulative length of the line assembly 60 will add more cumulative weight to the overall line assembly 60), the number of weights 80 used and somewhat of the mass of individual pieces of catalyst (or other) particulate matter 12 to be loaded.

The length of the reactor tubes 16 in most cases is from ten (3.02 meters) to sixty feet (18.29 meters) long. This is a factor in the number of spring blocks 70 to be mounted on each line assembly 60. The drive system 30 in combination with the plurality of cable partitions 40 attached to the spool 38 are use to keep each line assembly 60 straight and to inhibit tangling of the line assemblies 60.

Once a loading retraction rate is determined, the line assemblies 60 are marked (for the desired depth of penetration) and lowered, one each, per reactor tube 16. When the proper depth within the tubes 16 are reached, the spool 38 is locked into place and set for loading of particulate matter 12. The variable speed motor 32 and controller 50 allow the operator to set and to change the retraction rate as needed.

The reactor tubes 16 may have various regions of disuniformity 18 such as, for example, regions of tube weld and weld impingement, bends in the tube, etc. The line assemblies 60 with weight 80 and springs 74 enable navigation of such regions of disuniformity 18.

In one embodiment, by way of example only and not limited thereto, the block portion 72 of the spring block 70 may have a 0.25 inch diameter and be two inches long. In such an example embodiment, the springs 74 may be 1.125 inches long having a 0.125 inch diameter. Such an embodiment may be used in reactor tubes having a 1.1875 inch inner diameter with catalyst particulate sized at 0.09 inch diameter. In such a case, each consecutive spring 74 should be staggered such that a gap 75 from the vertical (see FIG. 4) between each consecutive spring 74 should not exceed about 0.08 inch (i.e. less than the diameter of each individual catalyst particulate 12). The diameter and the length of the block portion 72 as well as its mass may be changed according to the parameters of any particular catalyst particulate 12 or other particulate loading task. The block portion 72 may be hollow or a solid stock. Every loading operation may be different due to differing catalyst particulate 12 and variances in tube 16 dimensions with the result that every line assembly 60 can be designed differently as dependent upon the respective loading operation.

The length of each spring 74 is dependent upon the inner diameter of the tube 16 and the size of the catalyst particulate 12. For example, depending upon the catalyst it might be desirable to have a three to four millimeter clearance between the end of each spring 74 and the inner diameter of the tube 16.

The flight of the helical-pattern 76 may be at an angle of about forty-five degrees from the horizontal (but may be other angles of inclination), preferably has two flights (due to springs 74 protruding on two opposite sides of the block portion 72), and directs particulate about three-hundred-sixty degrees or more downwardly-around the block portion 72 (without falling through gaps between consecutive springs 74 and gaps between the ends of the springs 74 and the inner diameter of the tube 16). Using a proper stagger distance and/or spring 74 flight overlap, spring stiffness and flight, the particulate matter 12 does not fall through gaps in the stairs (springs 74), but travels down the helical steps (springs 74). Moreover, upon impact with the springs 74, the particulate will bounce down the springs 74 causing the spring blocks 70 to rotate via swivel connectors 66. Thus, the vertically downward velocity of each particle 12 will be diverted from the vertical. The rotation further assists particulate matter 12 dispersion, i.e., in the filling of tubes 16 with particulate matter 12 in a more uniform manner.

What is claimed is:

1. A method for loading a particulate matter into a reactor tube within a reactor, comprising the steps of:
    lowering a line assembly into the reactor tube;
    dropping the particulate matter over the line assembly;
    breaking the fall of the particulate matter with the line assembly:
    dropping the particulate matter from a lower end of the line assembly into the reactor tube at a particulate loading rate while withdrawing the line assembly from the reactor tube; and
    varying a rate that the line assembly is withdrawn from the reactor tube in accordance with the particulate loading rate into the reactor tube.

2. The method of claim 1, further comprising moving a loading cart onto a tube sheet of the reactor and wherein the loading cart is configured for dropping the particulate matter and varying the rate the line assembly is withdrawn.

3. The method of claim 1, further comprising controlling the rate that the line assembly is withdrawn using a variable speed drive system.

4. The method of claim 1, wherein dropping the particulate matter further comprises preventing the particulate matter from fracturing by varying the rate that the line assembly is withdrawn.

5. The method of claim 2, wherein said step of varying the rate that the line assembly is withdrawn from the reactor tube in accordance with the particulate loading rate further comprises a varying particulate loading rate into the reactor tube.

6. The method of claim 5, wherein varying the rate that the line assembly is withdrawn further comprises controlling a motor of a drive system.

7. The method of claim 6, further comprising manipulating a controller to control the motor, wherein the motor is an electric motor.

8. A method for loading a particulate matter into a plurality of reactor tubes simultaneously within a reactor, comprising:
    lowering a plurality of line assemblies into the reactor tubes;
    dropping the particulate matter over the plurality of line assemblies;
    breaking the fall of the particulate matter with the plurality of line assemblies;
    dropping the particulate matter from a lower end of the plurality of line assemblies into the reactor tubes at a respective particulate loading rate while withdrawing each of the plurality of line assemblies from the reactor tubes; and
    varying a rate that the plurality of line assemblies are withdrawn from the reactor tubes in accordance with the respective particulate loading rates into the reactor tubes.

9. The method of claim 8, further comprising moving a loading cart onto a tube sheet of the reactor and wherein the loading cart is configured for dropping the plurality of line assemblies and dropping the particulate matter.

10. The method of claim 8, further
    wherein said step of varying the rate that the plurality of line assemblies are withdrawn from the reactor tubes in accordance with the respective particulate loading rates further comprises a varying particulate loading rate into each of the reactor tubes.

11. The method of claim 10, wherein varying the rate that the plurality of line assemblies are withdrawn further comprises controlling a motor of a drive system.

* * * * *